United States Patent [19]
Watkins et al.

[11] Patent Number: 5,224,543
[45] Date of Patent: Jul. 6, 1993

[54] USE OF SCALE INHIBITORS IN HYDRAULIC FRACTURE FLUIDS TO PREVENT SCALE BUILD-UP

[75] Inventors: David R. Watkins, Irvine; Joseph J. Clemens, Midway City, both of Calif.; John C. Smith, Midland, Tex.; Surinder N. Sharma, Diamond Bar; Hetty G. Edwards, Fullerton, both of Calif.

[73] Assignee: Union Oil Company of California, Los Angeles, Calif.

[21] Appl. No.: 753,200

[22] Filed: Aug. 30, 1991

[51] Int. Cl.$^5$ .................. E21B 43/12; E21B 43/26
[52] U.S. Cl. .......................... 166/279; 166/300; 166/308; 166/312; 252/8.551; 252/8.552
[58] Field of Search ............... 166/279, 300, 308, 312; 252/8.551, 8.552

[56] References Cited

U.S. PATENT DOCUMENTS

| | | | |
|---|---|---|---|
| 3,481,400 | 12/1969 | Kerver et al. | 166/279 |
| 3,782,469 | 1/1974 | Fulford | 166/279 |
| 3,974,077 | 8/1976 | Free | 166/308 X |
| 4,619,776 | 10/1986 | Mondshine | 166/308 X |
| 4,670,166 | 6/1987 | McDougall et al. | 166/279 X |
| 4,708,207 | 11/1987 | Kalfayan et al. | 166/312 X |
| 4,947,934 | 8/1990 | Hen | 166/279 |
| 5,110,486 | 5/1992 | Manalastas et al. | 166/308 X |

*Primary Examiner*—George A. Suchfield
*Attorney, Agent, or Firm*—Charles L. Hartman; Gregory F. Wirzbicki

[57] ABSTRACT

Scale inhibitor is added to a cross-linked fracturing fluid as an integral part of the fracturing fluid. Preferred fracturing fluids are borate cross-linked and the preferred scale inhibitor is polyacrylate. In another embodiment of this invention, the fracturing fluid is prepared by adding a scale inhibitor to a fracturing fluid at a pH of between 8.5 and 10.5. In a third embodiment, the fracturing fluid prepared above is used to fracture subterranean formations. In a fourth embodiment, the fracturing fluid is used to pressurize a subterranean formation to break scale near the hydrocarbon wellbore.

6 Claims, No Drawings

USE OF SCALE INHIBITORS IN HYDRAULIC FRACTURE FLUIDS TO PREVENT SCALE BUILD-UP

BACKGROUND OF THE INVENTION

1. Field of the Invention

This invention relates to methods of fracturing hydrocarbon containing subterranean formations, and particularly to methods of controlling scaling in such fracturing operations.

2. State of Art

One common cause of production declining in a mature hydrocarbon well is fouling of the perforations in the well casing and the structure of the formation around the well with scale precipitated from brine frequently found down hole. The production may be revived, at least partially, with a stimulation technique. One commonly used technique is hydraulic fracturing. In the process of hydraulic fracturing, a fracturing fluid is injected at high pressure into a subterranean formation to create artificial cracks in the subterranean formation. A propant added to the fracturing fluid fills the fractures to maintain the openings created by the crack. Hydraulic fracturing not only exposes new rock, but it also tends to break scale down hole. Although the fracture exposes new rock and breaks scale, once the fracture has been made and hydrocarbon production resumed, the well and the adjacent subterranean formation are still subject to scaling from precipitating minerals from subterranean brines, for example, calcium sulfate and calcium carbonate.

Since hydraulic fracturing is costly, sometimes costing as much as drilling the well in the first place, it is necessary that future build-up of scale be prevented as much as possible. One common solution is performing two separate operations, a fracturing operation followed by a scale inhibiting operation. Using a second operation to inhibit scale in the subterranean formation after the fracturing operation, does not provide an effective method for preventing scale in most wells. In these wells, the subterranean formation, as well as the perforations in the well casing, are plugged by scale. However, the two-step process contacts only that portion of the hole nearest the well with scale inhibitor. Because such a small portion of scale inhibitor is injected, most of the fracture is not contacted by scale inhibitor. Furthermore, the amount of scale inhibitor injected into the hole may be rapidly depleted. Then the well operator is faced with a second descaling operation, or even a second fracture job. In "Removal and Inhibition of Calcium Sulfate Scale in Water Flood Projects," C. F. Smith et al., *J. Petroleum Technology*, Nov. 1968, p. 1219 the general solution of a two-step descaling operation using a phosphonate scale inhibitor to prevent calcium sulfate scale is discussed.

A fracturing fluid that prevents or inhibits scale formation would be extremely useful in the oil field. Such a fracturing fluid would put the scale inhibitor deep into the fracture, in a one-step operation. But such a fracturing fluid must, on the one hand, preserve the viscosity of cross-linking gel, and on the other, preserve the activity of the scale inhibitor. And, a significant amount of scale inhibitor should adsorb to the subterranean formation rock.

SUMMARY OF THE INVENTION

Hydrocarbon well-scaling is prevented or inhibited by adding a scaling inhibitor to a cross-linked fracturing fluid at high pH.

In a first aspect of this invention, a subterranean formation is fractured by pumping a fracturing fluid comprising a mixture of a gelling agent, a cross-linker, a scale inhibitor, enough base to maintain a pH of between 8.5 and 10.5, and a propant into a subterranean formation under enough pressure to crack the subterranean formation and force the fluid into the subterranean formation. Newly made fractures then have scale inhibitor in place in the fracture to help prevent scale from forming.

In a second aspect of this invention, a mixture of a gelling agent, a cross-linker, a scale inhibitor, and a propant at a pH of between 8.5 and 10.5 are pumped down hole into a subterranean formation under enough pressure to crack the subterranean formation but not enough to allow the crack to propagate into the subterranean formation. This aspect of the invention allows removing scale formed at the perforations to be cleaned and forms a new path from the subterranean formation, past any residual scale, to the perforations.

In a third aspect of this invention, a scale preventing fracturing fluid comprising a gelling agent, for example, guar gum, cross-linker, a scale inhibitor, a propant and enough base to adjust the pH of the solution to between 8.7 and 10.5 is produced. The mixture can include other ingredients, for example, viscosity breakers and surfactants. The fracturing fluid, or part of the fluid, can be made in a batch and then pumped down hole, or all or part of the ingredients can be mixed "on the fly" as the fracturing fluid is pumped down hole.

In a fourth aspect to this invention, a fracturing fluid composition containing a gelling agent, for example, guar gum, a cross-linker, a scale inhibitor, a propant and enough base to adjust the pH of the solution to between 8.7 and 10.5, is provided. The mixture can include other ingredients, for example, viscosity breakers and surfactants. This fracturing fluid has the advantage that it has the same rheology as conventional fracturing fluids and it provides scale inhibitor in a form that readily adsorbs to the subterranean formation rock.

DETAILED DESCRIPTION OF THE INVENTION

Fracturing fluids comprise several key ingredients: water, a gelling agent, a cross-linking agent, and various additives for controlling pH and breaking the gel at predictable times. Suitable gelling agents for this invention include any of the commonly used fracturing gelling agents; guar gum, hydroxypropyl guar gum, and like gelling agents that can be cross-linked. It is preferable that the gelling agent selected be cross-linkable with borate.

Merely adding scale inhibitors directly to the fracturing fluid to prevent subsequent scaling, is normally considered to be a poor solution to the problem of placing a scale inhibitor in the formation, creating more new problems than it solves. "Well Stimulation and Scale Inhibitors," by O. J. Vetter et al., SPE 17284, teaches several different problems associated with adding the scale inhibitor directly to the fracturing fluid and comes to the general conclusion that adding scale inhibitor to a fracturing fluid is impractical. A first problem is that scale inhibitors do not effectively inhibit scale at low (acidic) pH. However, most transition metal cross-linked fracturing fluids are adjusted to acid pH. Another problem is that scale inhibitors may not adsorb properly on the subterranean formation rock down hole under the conditions of a cross-linked fracturing operation. Therefore, the scale inhibitor may not be down hole for long after the descaling operation. But the most serious problem is that scale inhibitors quickly destroy the cross-linkages in a metal cross-linked gel, resulting in a greatly diminished capacity for carrying propant into the crack. Surprisingly the inventors have found that addition of a scale inhibitor to the fracturing fluid can work, if the cross-linking agent and the scale inhibitor are chosen judiciously.

The cross-linking agent must retain its cross-linkages in the presence of a scale inhibitor. An example of such a cross-linking agent is boric acid ($H_3BO_3$) at a pH between 8.5 and 10.5. It is believed that the borate ion $B(OH)_4^-$ is the active cross-linking species. High pH is required to shift the equilibrium of the following equation:

$$H_3BO_3 + OH^- \rightarrow B(OH)_4^- \tag{1}$$

to the borate side. The pH of a borate cross-linked fracturing fluid is important to the ease of formulation and the ability of the fracturing fluid to maintain the proper consistency down hole and still inhibit scale. If the pH is too low, the scale inhibitor will not work properly, but if it is too high, the gel will not cross-link properly and the propant will not be supported.

The fracturing fluid is made by hydrating a gelling agent then adding surfactants, gel breakers and pH modifiers to this mixture. The correct pH for a borate cross-linked fracturing fluid, between 8.5 and 10.5, can be achieved by adding the scale inhibitor to the fracturing fluid in one of two ways: first, adding the cross-linking agent then adding the pH modifier and scale inhibitor, or second, modifying the pH after adding the scale inhibitor but before adding the cross-linking agent. In the case of borate cross-linking agent, the choice is up to the operator, but other cross-linking agents do not have the property of reversibly cross-linking, and the order of addition can be important. If so the pH must be optimized before scale inhibitor addition. If the fracturing fluid is made adding the scale inhibitor first, the pH of the gel will fall from about 9.5 to about 6.5. A base, preferably one that contains an alkaline metal, such as sodium hydroxide or potassium hydroxide, is added to adjust the pH back to the preferred range of 8.5 to 10.5.

The presently preferred scale inhibitors are selected from the group consisting of polyacrylates, phosphonomethylated amines, and polyphosphonic acids, all having molecular weights between about 2,500 and 20,000, preferably less than 5,000. The polyacrylates are especially preferred. The preferred class of polyacrylate scale inhibitors have a repeating structure represented by the following formula:

$$(-CH_2-CH-CH_2-)_y \tag{2}$$
$$\phantom{(-CH_2-}|\phantom{CH-CH_2-)_y}$$
$$\phantom{(-CH_2-}CO_2R$$

where R is an organic radical selected from the group of alkyl radicals having six or fewer carbon atoms or hydrogen, and y = 25 to 200. These scale inhibitors have the advantage that they are stable and active at the conditions required for cross-linking a borate gel. Polyacrylates maintain the highest level of the desired activity at the required pH.

The fracturing fluid is normally prepared in the field in one of two ways. It can be prepared either by mixing all the ingredients together in a batch or by mixing them on the fly as the fracturing fluid is pumped. When the fracturing fluid is made as a batch, the hydrated gel matrix is mixed with buffers to maintain a pH of about 10. After a surfactant is added the fluid is allowed to hydrate for 45 minutes of so. This is the precross-linked fluid. The gel breakers are added to the precross-linked fluid, dropping the pH to about 9.8. Preferred gel breakers are either oxidative or enzymatic. A particularly preferred gel breaker is the oxidative breaker ammonium persulfate. As a last step the scale inhibitor, the cross-linker, the pH modifier, and the propant are added. The propant used in conjunction with the fracturing fluid in such a well can be any normally used propant: sand, sintered bauxite, metal shot, or the like, but, in the preferred lower pressure hydrocarbon wells (4,500 psia or less) sand works well and is the least costly propant. The prepared batch of fracturing fluid is then pumped down hole.

If the fracturing fluid is prepared by adding ingredients on the fly, the precross-linked fluid is pumped down hole, and the other ingredients are added at the well head. As the precross-linked fluid passes into the hole, an aqueous gel breaker solution, an aqueous cross-linker solution, an aqueous scale inhibitor solution, and a base solution, as well as the propant, are all added at the hydrocarbon well head, and the solutions are allowed to mix on the way down to the subterranean formation. The pH of the mixture entering the well must be closely monitored since the cross-linking agents and the scale inhibitor are pH sensitive. Usually pH is modified by adding base, and continuously adjusting the addition rate of the base, although, in some exceptionally alkaline wells it may be preferable or necessary to add acid to maintain the desired pH range.

Candidate hydrocarbon wells for the fracturing fluid of this invention include any hydrocarbon wells identified for fracturing having a down hole temperature of less than 300° F., preferably less than 250° F. and most preferably less than 200° F. The pressure is usually less than about 5,000 psia, preferably less than 4,500 psia. The fracturing fluid of the invention is used in the field the same as a conventional fracturing fluid which could be used for the same hydrocarbon well. The fracturing fluid has a fluid rheology substantially unchanged from that of conventional fracturing fluids. When, for example, the viscosity of the fracturing fluid is measured on a Frann 50 viscometer at 120° F., the flow index (N') and the consistency (K') are found to be within normal limits. Therefore, the behavior of the fracturing fluid in the subterranean formation can be inferred from the known behavior of conventional fracturing fluids.

One cause of reduced flow from a hydrocarbon well is scale forming in the subterranean formation immediately adjacent the wellbore and in the perforations in the casing. The scale, formed from minerals that crystallize from the fluids down hole, can be cracked by pressurizing a fluid to the fracturing point of the subterranean formation, but not allowing the fracture to propagate into the subterranean formation. This breaks the scale and allows hydrocarbons to flow to the wellbore for easy removal. The scale inhibitor in the fluid used prevents rapid deposition of new scale. One preferred fluid for this operation is a fracturing fluid having no propant added.

Although this invention has been primarily described in conjunction with references to preferred embodiments thereof, it is evident that many alternatives, modifications and variations will be apparent to those skilled in the art in light of the foregoing description. Accordingly, it is intended that the spirit and scope of the appended claims embrace all such alternatives, modifications and variations.

What is claimed is:

1. A method of fracturing a hydrocarbon-bearing subterranean formation comprising:
   a) pumping a borate cross-linked fracturing fluid gel having a pH between 8.5 and 10.5 including a polyacrylate scale inhibitor down hole;
   b) pressurizing the fracturing fluid sufficiently to fracture a subterranean formation located down hole having a temperature less than 300° F. and force the fracturing fluid and the scale inhibitor into the subterranean formation.

2. The method of claim 1 wherein the maximum fracturing fluid pressure down hole is less than 4,500 psia.

3. The method of claim 1 further comprising the step of breaking the gel down hole forming a lower viscosity liquid and removing resulting the lower viscosity liquid.

4. The method of claim 1 wherein the scale inhibitor substantially remains in the subterranean formation.

5. A method to remove scale, and inhibit its return, from the down hole perforations of the well casing of a hydrocarbon well in a subterranean formation comprising:
   a) pumping a borate cross-linked fracturing fluid having a pH between 8.5 and 10.5 including a polyacrylate scale inhibitor down hole;
   b) pressurizing the fluid to a pressure at least as high as that required to fracture a subterranean formation having a temperature less than 300° F.;
   c) forcing the fracturing fluid and the scale inhibitor past the perforations in the well casing; and
   d) removing the pressure applied before a fracture propagates into the subterranean formation.

6. The method of claim 5 further comprising removing the fracturing fluid from the well.

* * * * *